US011282092B2

(12) United States Patent
Ratnaswamy et al.

(10) Patent No.: US 11,282,092 B2
(45) Date of Patent: Mar. 22, 2022

(54) SYSTEM AND METHOD FOR UNIVERSAL DATA MODELING

(71) Applicant: JPMorgan Chase Bank, N.A., New York, NY (US)

(72) Inventors: Sid Ratnaswamy, Woodside, NY (US); Lana Kapulovskaya, New York, NY (US)

(73) Assignee: JPMorgan Chase Bank, N.A., New York, NY (US)

( * ) Notice: Subject to any disclaimer, the term of this patent is extended or adjusted under 35 U.S.C. 154(b) by 252 days.

(21) Appl. No.: 16/038,748

(22) Filed: Jul. 18, 2018

(65) Prior Publication Data

US 2019/0026759 A1 Jan. 24, 2019

Related U.S. Application Data

(60) Provisional application No. 62/533,737, filed on Jul. 18, 2017.

(51) Int. Cl.
| | | |
|---|---|---|
| *G06Q 30/02* | (2012.01) | |
| *G06Q 30/00* | (2012.01) | |
| *G06N 20/00* | (2019.01) | |
| *G06F 16/28* | (2019.01) | |
| *G06F 40/10* | (2020.01) | |

(52) U.S. Cl.
CPC ....... *G06Q 30/0201* (2013.01); *G06F 16/288* (2019.01); *G06F 40/10* (2020.01); *G06N 20/00* (2019.01); *G06Q 30/016* (2013.01)

(58) Field of Classification Search
None
See application file for complete search history.

(56) References Cited

U.S. PATENT DOCUMENTS

| | | | |
|---|---|---|---|
| 9,686,372 B1* | 6/2017 | Anne | H04L 67/2842 |
| 2005/0055275 A1* | 3/2005 | Newman | G06Q 30/0205 |
| | | | 705/14.41 |
| 2007/0214037 A1* | 9/2007 | Shubert | G06Q 20/385 |
| | | | 705/7.32 |
| 2012/0239375 A1* | 9/2012 | Laxmanan | G06Q 10/06 |
| | | | 703/22 |
| 2014/0297268 A1* | 10/2014 | Govrin | G06N 5/04 |
| | | | 704/9 |
| 2014/0337089 A1* | 11/2014 | Tavares | G06Q 20/30 |
| | | | 705/7.29 |
| 2016/0026692 A1* | 1/2016 | Cannaliato | G06F 16/215 |
| | | | 707/755 |
| 2016/0232564 A1* | 8/2016 | Blackhurst | G06Q 30/0255 |
| 2016/0234322 A1* | 8/2016 | Blackhurst | H04L 67/02 |

\* cited by examiner

*Primary Examiner* — Aleksandr Kerzhner
*Assistant Examiner* — Anugeetha Kunjithapatham
(74) *Attorney, Agent, or Firm* — Hunton Andrews Kurth LLP (57) ABSTRACT

Systems and methods for universal data modeling are disclosed. Exemplary embodiments include an information processing apparatus that can acquire a plurality of different data types form different sources that contains both anonymous and nonanonymous customer data. This data is ingested into a data repository and a quality control check is applied to the data The data is enriched and data analytics are applied to the data in order to associate at least some of the data with a customer.

8 Claims, 5 Drawing Sheets

SYSTEM AND METHOD FOR UNIVERSAL DATA MODELING

RELATED APPLICATIONS

This application claims priority to U.S. Provisional Patent Application Ser. No. 62/533,737, filed Jul. 18, 2017, the disclosure of which is hereby incorporated, by reference, in its entirety.

BACKGROUND OF THE INVENTION

1. Field of the Invention

The present disclosure generally relates to systems and methods for universal data modeling.

2. Description of the Related Art

In general, Customer Relationship Management (CRM) tools typically track separate distribution channels. Thus, marketing personnel cannot gain a "holistic" view of how effective a marketing campaign may be. For example, management may wish to know what marketing campaigns were most effective in reaching certain goals, how often did meetings occur after a digital interaction, what targets went back to an organization's website after a meeting or phone call, the amount of sales that is attributable to digital interactions and campaigns, what is the return on investment ("ROI") on a marketing investment, etc. In addition, there is no way to know which marketing channels marketers should be used for specific customers or small clusters of customers.

SUMMARY OF THE INVENTION

Systems and methods for universal data modeling are disclosed. According to one embodiment, in an information processing apparatus comprising at least one computer processor, a method for universal data modeling may include: (1) acquiring a data of a plurality of different data types from a plurality of data sources, the data comprising anonymous and nonanonymous customer data for customers of an organization; (2) ingesting the data into a data repository; (3) applying at least one quality control check to the data; (4) enriching the data; and (5) performing data analytics on the data to associate some of the data with one of the plurality of customers.

In one embodiment, the data sources may include data sources that are internal to the organization and data sources that are external to the organization.

In one embodiment, the data types may include paid or bought data, earned data, owned data, or unstructured data.

In one embodiment, the step of ingesting the data may include adapting an ingestion framework in response to a change in a format for the data. This may include automatically rewriting code for the ingestion framework.

In one embodiment, the quality control check may check for a missing value, an incorrect format, or data integrity. In another embodiment, the quality control check may check for an anomaly.

In one embodiment, the method may further include assigning a score to the data based on the quality control check.

In one embodiment, the step of enriching the data may include applying natural language processing to process the data.

In one embodiment, the step of performing data analytics on the data to associate the data with one of the plurality of customers may include using machine learning to associate the data with the customer.

In one embodiment, the method may further include de-anonymizing the anonymous customer data.

In one embodiment, the step of enriching the data may include analyzing at least one customer online behavior in the data to identify a product or service with which the customer is interested; and associating the product or service with the customer. The customer online behavior may include at least one of an interaction with a web page, a mouse movement, a cursor movement, and an activated link.

In one embodiment, the associated data may provide an organizational-wide view of the customer's relationships with the organization.

In one embodiment, the method may further include generating a visualization of the organizational-wide view of the customer's relationships with the organization.

In one embodiment, the method may further include identifying a course of action for interacting with the customer based on the associated data.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein related to systems, methods, and devices for universal modeling.

Embodiments disclosed herein relate to a universal marketing tool that may be associated with, or tied into, a plurality of marketing platforms, including, for example, Google AdWords and Analytics, DoubleClick Manger, DoubleClick Bid Manager, etc. to track the path(s) that customers may use to request information, to make purchases, etc. The data from the multiple sources may be normalized. By understanding which platform(s) customers use before making a purchase or to aid in making a purchase, marketers may develop highly effective marketing campaigns.

In one embodiment, the impact of marketing on sales and model for sales leads may be identified.

In one embodiment, machine learning may be used to define a successful campaign, and to retarget an existing campaign.

In one embodiment, text analytics of sales processing of call notes may be used to identify specific products that were discussed.

Although the disclosure may be made in the context of financial advisors and financial products, it should be recognized that the disclosure is not so limited and may have applicability to any industry where marketing and sales efforts may be tracked.

An example analytics process may include understanding business opportunities and business requirements (e.g., during a period of interest, how often does a Financial Advisor (FA) visit the web? What is average time gap between web visits for FAs? What is the difference of open rate between marketing emails for specific bonds and core bonds?). Then, the data may be understood, prepared, modeled, evaluated, deployed, and monitored.

In embodiments, marketing data may be presented in a highly usable, de-normalized, curated format. Predictive analytics models and performance, index and bench marks, market data, economic indicators, product strategy, etc. may be automated and applied as is necessary and/or desired.

In embodiments, the systems and methods disclosed herein may measure the business value of marketing campaigns, optimize sales team time, and may use previously-unused business data.

In embodiments, the systems and methods may integrate, for example, records of client advisor conversations, records of phone logs, records of web activity, records of marketing activity, records of email activity, records of transactions and redemptions, etc. These records may reside on different platforms; thus, in embodiments, the each platform may communicate the data using a universal language for each platform having universal structure In embodiments, cookies or other identifiers may be used to track web visits. For example, when a user accesses a website, the user's cookie, or cookies, may be retrieved. The system may then review records of information to identify the user associated with the cookie. Thus, embodiments may de-anonymize anonymous traffic.

In one embodiment, when data is received from, for example, Google Analytics, it may be in JSON format. Thus, it is nested data and it is not structured in any useful way. Thus, embodiments use a data structure transformation process using algorithms to de-anonymize the data. Thus, source data may be formatted in a generic representation so it has the same format regardless of the data source.

Figure 1:
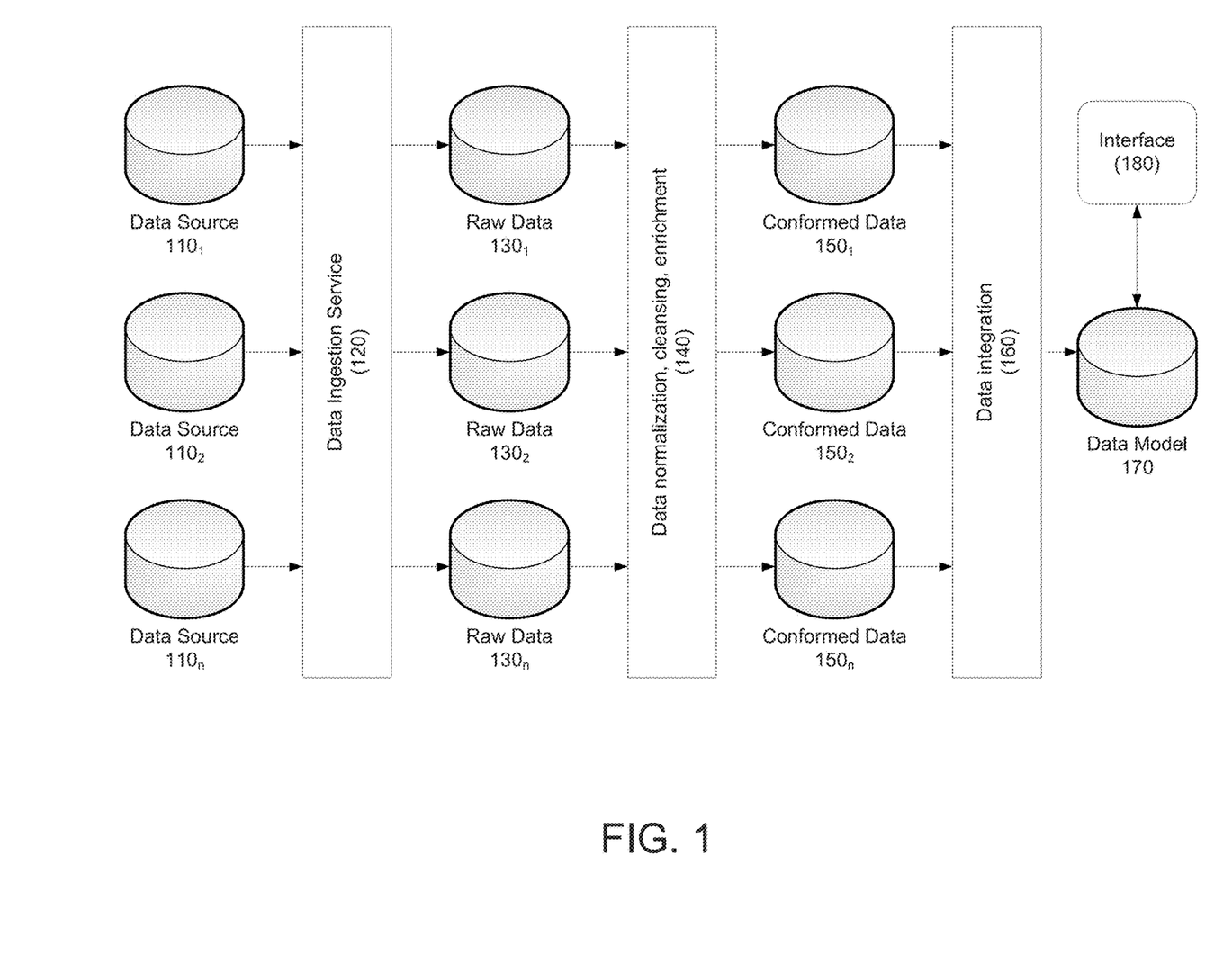
FIG. 1 depicts a system for universal data modeling according to one embodiment.

Referring to FIG. 1, a system for universal modeling is disclosed according to one embodiment. System 100 may include data sources $110_1$, $110_2$, $110n$. Examples of data sources 110 include internal data sources, cloud data sources, external data sources, etc.

In an financial institution environment, data may include paid/bought data (e.g., fund performance, consortium data, etc.); earned data (e.g., portfolio insights, holdings at the financial advisor level, web behavior (e.g., user actions on a web page, mouse and/or cursor movements, activated links, etc.), interest profiles, etc.), owned data (e.g., internal fund performance, transaction and holdings data, sales activity, etc.), and unstructured data (e.g., call notes, inbound and outbound emails and messages, etc.).

System 100 may further include data ingestion services 120, which may ingest the data from data sources $110_1$, $110_2$, $110_n$. Data ingestion services 120 may process the data from data sources $110_1$, $110_2$, $110_n$ into raw data $130_1$, $130_2$, $130_n$ so it can be normalized, cleansed, and enriched by data normalization, cleaning, and enrichment layer 140. Raw data $130_1$, $130_2$, $130_n$ may include raw historical data for reference.

In one embodiment, data ingestion services 120 may be based on a dynamic, meta-data driven approach that ingests data in various formats (relational and non-relational, structured and unstructured) across from data from data sources $110_1$, $110_2$, $110_n$.

For example, data may be cleaned using, for example, de-duplication, removing extra characters, converting the data to a consistent format, etc. Other techniques may be applied to cleanse the data as is necessary and/or desired.

The output of data normalization, cleaning, and enrichment layer 140 is conformed data $150_1$, $150_2$, $150_n$. Conformed data $150_1$, $150_2$, $150_n$ may include a consumable data set that may be cleansed, normalized, and enriched by, for example, data types, format, keys, etc.

Conformed data $150_1$, $150_2$, $150_n$ may be provided to data integration layer 160, which may integrate the data to be available in data model 170. Data model 170 may perform, or may make data available for, data analytics, the application of business logic, integration, etc. For example, in a financial institution environment, the data may be used for segmentation (e.g., identification of big clients), resource allocation (e.g., what is the most return on investment efficient coverage model), what is the next best action (e.g., what are the hottest leads), what is the next best product (e.g., what products are they interested in), etc.

In one embodiment, in integration layer 160, data may be integrated using, for example, fuzzy matching, text mining, etc. In one embodiment, the data may be normalized across some, or all, data sets.

In one embodiment, business logic may be applied. For example, metrics calculations may be performed, and dynamic and user-driven mappings and metrics may be applied.

In one embodiment, the data may be validated. For example, checks, such as data populations checks, missing value checks, and comparisons across the data set may be performed. The data may then be integrated into the single data model.

In one embodiment, the data from data model 170 may be output or made accessible to interface(s) 180, which may include, for example, workstations, applications, third parties, etc. or as otherwise necessary and/or desired.

In one embodiment, visualization models may provide information regarding the success of campaigns. Machine learning based on web site visits and web data access may be used in order to identify hits based on, for example, financial advisor contact.

In one embodiment, messages, such as summaries of event registrations, alerts, etc. may be generated as is necessary and/or desired.

Figure 2:
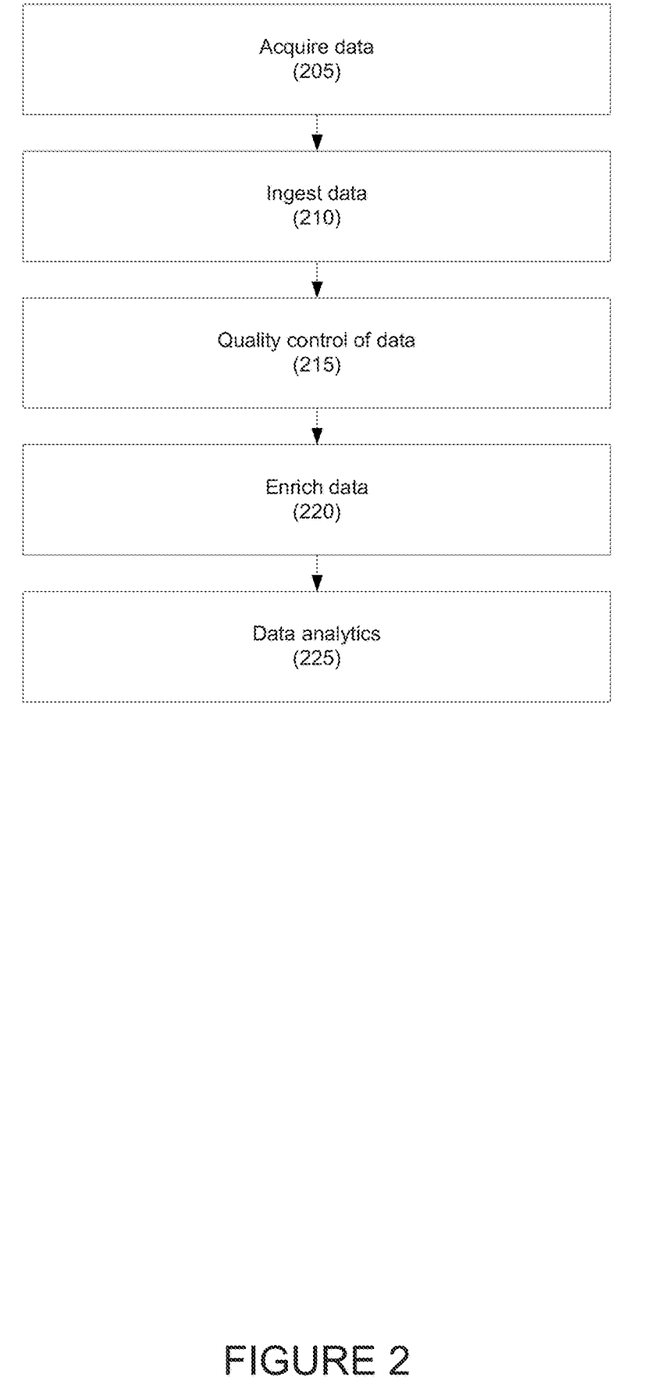
FIG. 2 depicts a method for universal data modeling according to one embodiment.

Referring to FIG. 2, a method for universal modeling is disclosed according to one embodiment. In step 205, data may be acquired from internal and/or external data sources. In one embodiment, internal data sources may include, for example, managed account vendor files, regional data warehouses, enterprise content management, real estate, iLite data (e.g., accounts, positions, transactions, instruments, foreign exchange rates, market prices, etc.), etc. Cloud data sources may provide data that may be stored in the cloud, such as digital marking data (e.g., Google Analytics, Google AdWords, Site Catalyst, etc.), customer data (e.g., funds data, institutional data, marketing data, etc.), and any other data as is necessary and/or desired. External data sources may provide market and/or opportunity data from third parties. Examples include market metrics, financial information, etc.

In an financial institution environment, data may include paid/bought data (e.g., fund performance, consortium data, etc.); earned data (e.g., portfolio insights, holdings at the financial advisor level, web behavior (e.g., user actions on a web page, mouse and/or cursor movements, activated links, etc.), interest profiles, etc.), owned data (e.g., internal fund performance, transaction and holdings data, sales activity, etc.), and unstructured data (e.g., call notes, inbound and outbound emails and messages, etc.).

In step 210, the data may be ingested. For example, the data from the data sources may be automatically ingested in various formats (e.g., relational and non-relational, structured and unstructured, etc.), across multiple data sources, etc. In one embodiment, the ingestion process may be flexible to adapt to changes in the source format. For example, when a new column is added, the new column is detected and the ingestion framework may adapt to ingest the data. The process may automatically re-write code to adapt to a new object structure. It may detect mappings affected by physical changes in a data source and may dynamically generate and execute all the rewritings on a data lake that are consistent with the semantics of the changed objects in the data source.

In addition, the ingestion process may dynamically detect the load method based on volume to ensure optimal load performance. It may capture and apply historical changes through, for example, an in-memory hashing algorithm while loading data into the data lake. This may improve time-to-market, reduce delivery cycle, and provide material cost savings.

In step 215, quality control may be applied to the data. In one embodiment, the quality control may be an automated process that is applied before the data is used. In one embodiment, anomaly detection and error detection may be performed, and alerts may be generated before the data is consumed.

In one embodiment, data quality rules may be applied at every stage of data processing and storage (e.g., at load time, raw zone, conformed zone, abstraction layer, etc.) The rules may perform a variety of quality checks from simple (e.g., missing values, incorrect format, data integrity) to more complex use cases (e.g., anomaly detection) though complex business rules checks and thresholds. The data quality process may also trigger alerts.

In one embodiment, each quality check may be assigned a score that may indicate overall quality of each data domain. Using a user interface or dashboard, the data quality framework may facilitate the visualization of critical issues, which allows for in-depth trend analysis, monitoring; and investigation of details.

In step 220, the data may be enriched. For example, Natural Language Processing ("NLP") may be used where unique identifiers do not exist to match unstructured text. For example, a customer may be contacted without using a customer identifier, and NLP may be used to recognize the customer's unique identifier.

In step 225, data analytics may be performed. In one embodiment, data may be generated using machine learning. For example, machine learning may be used to identify/ predict whether anonymous web behavior belongs to a current client, even without any contact details. Machine learning classification models/algorithms may be used to analyze anonymous behavior and create labels such as "Probable Client," "Not likely to be a client," etc. based on a machine learning score (e.g., support vector machines).

The layers may provide a "single view of the client," a 360 degree view of all client information that informs the next best action, product and investment. For example, this view may provide a distinct and centralized source of truth for client data, driven by flexible and consistent data model to support agility and data-driven decision making capabilities. In one embodiment, a single view of the client may provide a clean and integrated view of a client with aggregated layer, centralized rules and metrics and intuitive interface data to meet demands for a holistic view of client data. This may reduce risk by providing access to scrubbed and integrated data from a set of authoritative, trusted sources. In embodiments, applications may be provided with one single interface to collect and analyze the data, significantly reducing development and deployment work for the technology team.

Figure 3:
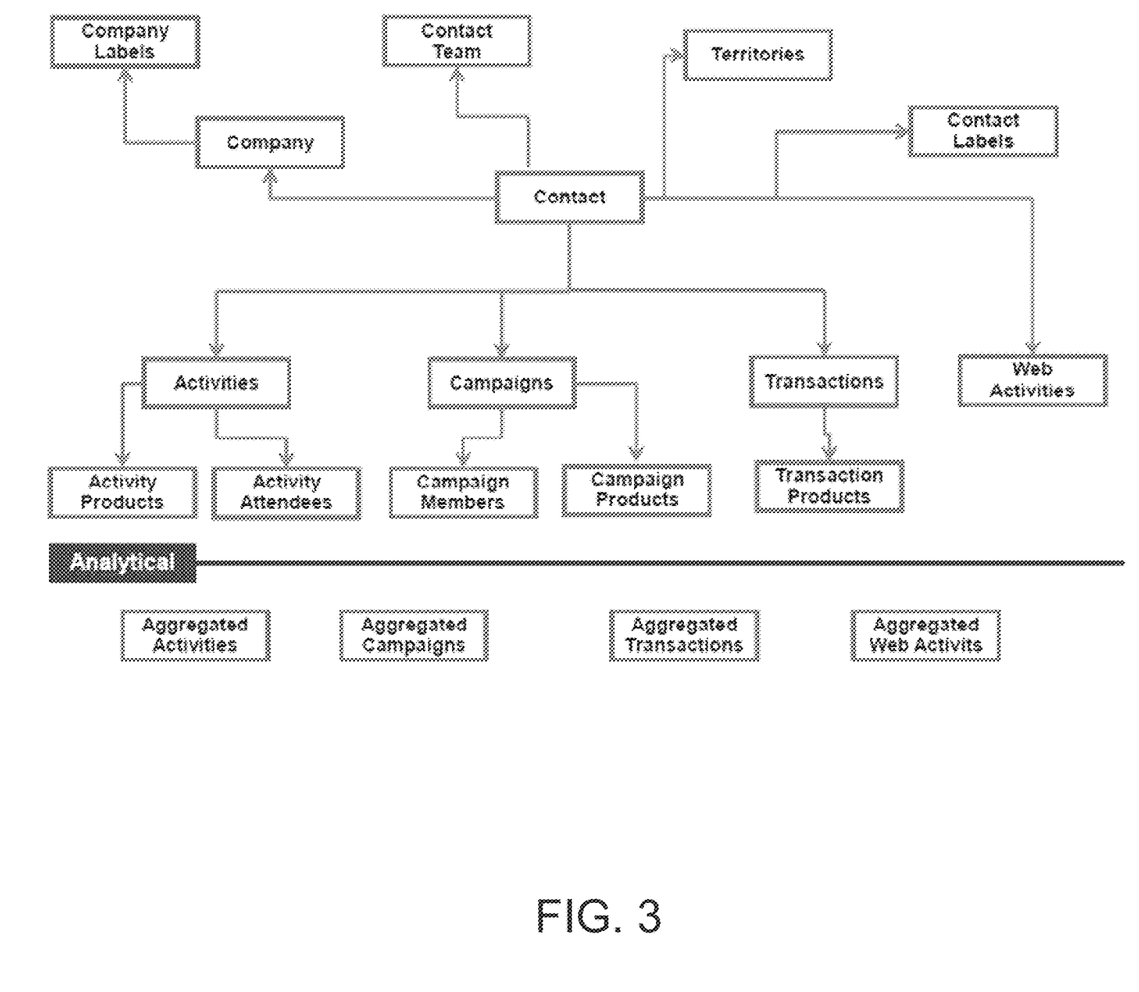
FIG. 3 depicts a conceptual view of a data model for a contact according to one embodiment.

A conceptual view of a data model for a contact is illustrated in FIG. 3.

Figure 4:
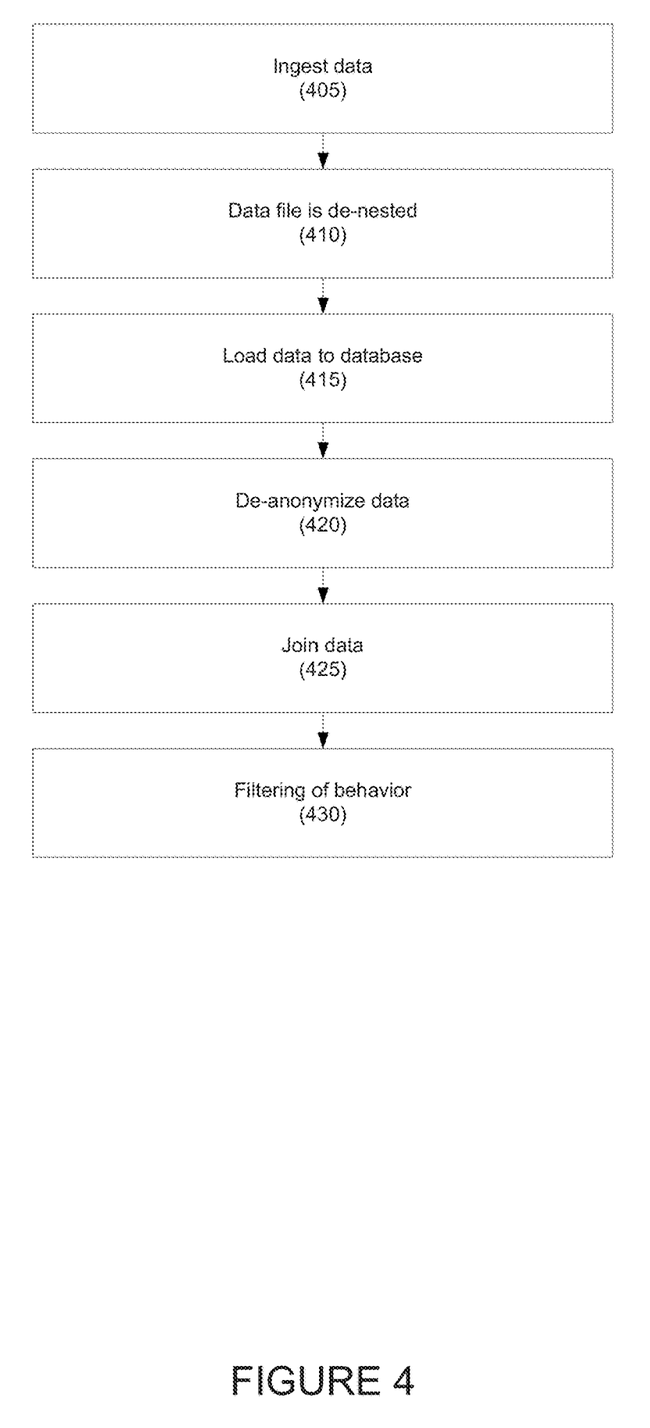
FIG. 4 depicts a method for universal modeling according to one embodiment.

Referring to FIG. 4, a method for universal modeling is disclosed according to another embodiment. In step 405, data may be ingested from internal data sources, external data sources, etc. This step may be similar to steps 205 and 210, above.

In step 410, the data files from the ingested data may be de-nested to a relational format.

In step 415, the data in the relational format may be loaded into a database, such as Greenplum.

In step 420, the data may be de-anonymized. In one embodiment, one of more cookies or other identifiers may be used to de-anonymize the data by linking the cookie or identifier to a user.

In step 425, the data may be joined and viewed with document product meta-data.

In step 430, a user's web behavior may be filtered to identify interest in a product or service. For example, the user's actions on a web page, mouse and/or cursor movements, activated links, etc. may indicate that the user has an interest in a specific product and/or service.

Figure 5:
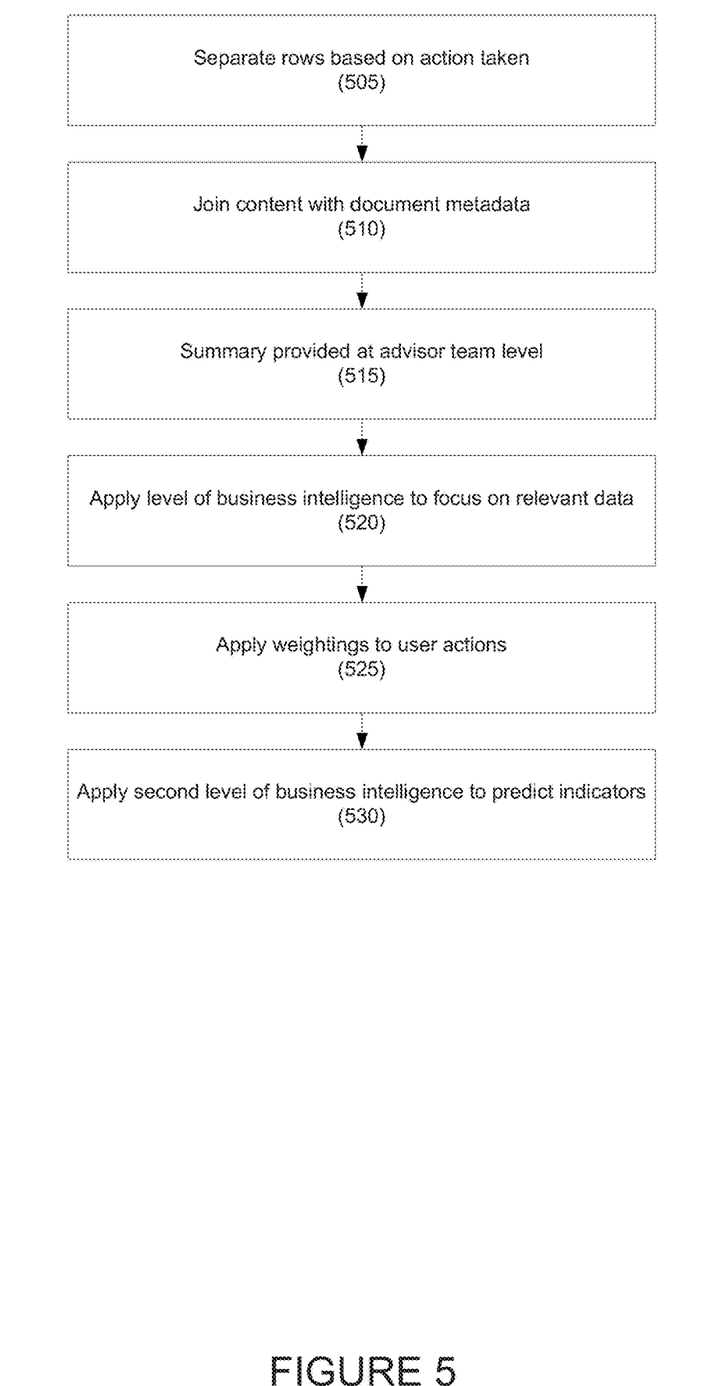
FIG. 5 depicts a method for processing marketing messages according to one embodiment.

Referring to FIG. 5, a method for processing marketing messages is provided. In step 505, one row may be separated into separate rows for each action taken (e.g., send, open clicked link to content).

In step 510, content viewed may be joined with document product metadata. For example, customer service calls, customer calls, meetings, and transactions may be retrieved and formatted to generic representations. Events, summit attendance, web casts, broad market calls, conference calls, and any other group meeting where one or more representative is invited may be retrieved. In one embodiment, these events may be represented in generic format and may be joined with content viewed with document product metadata.

When all action sources are pulled together, they may reside in one table with each action being labeled by source type. There may be a common set of attributes that cross sources and some are specific to a source.

In step 515, for all data sources, the data may be processed in order to provide a summary for an advisor team level. Additional sources may be added to generic interaction structure, such as customer support calls.

Other data formatting and/or manipulation may be used as necessary and/or desired.

In step 520, a layer of business intelligence may be applied to focus on relevant data. For example, in one embodiment, not every mouse movement, click, etc. needs to be tracked. In other words, a single mouse movement may not be informative, but multiple movements may indicate that the user is scrolling through a webpage, suggesting that the user is reading the webpage.

In step 525, weightings may be applied to each user action. In one embodiment, machine learning may be used to set the weightings. In one embodiment, the weightings may be for a specific user, for multiple users in a group (e.g., men, women, age groups, etc.), or for all users. For example, in one embodiment, if a user tends to inquire more a about a product that he or she spends time reading, a greater weighting may be applied to those actions than for click-throughs.

In step 530, a second layer of intelligence may be applied to predict which actions are most likely to create an outcome, such as an increase in sales, etc. For example, when a user visits a page, and downloads a product PDF, the probability of a sale may increase from 5 percent to 40 percent. Thus, these types of transactions may be highlighted.

In one embodiment, machine learning may be used to identify such actions. For example, based on historical data, the system may learn which actions are likely to result in an increase in sales, and actions that are less likely to result in increased sales. The machine learning may result in weighting of different actions.

Embodiments may provide some of all of the following: a single, distributed platform to support many applications built by variety of teams consuming client data, fully automated meta-data driven ingestion framework that instantly adapts to changes in source data model and transforms target to land new data structure, high-throughput to handle large volumes of data like web activities from Google Analytics, reliable to capture and store historical data and critical updates, scalable to archive data for long periods and support integration with other systems, a user interface that allows to search and connect data, granular data entitlement, scalable micro-services for integration, etc.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a cardholder or cardholders of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "cardholder interfaces" may be utilized to allow a cardholder to interface with the processing machine or machines that are used to implement the invention. As used herein, a cardholder interface includes any hardware, software, or combination of hardware and software used by the processing machine that allows a cardholder to interact with the processing machine. A cardholder interface may be in the form of a dialogue screen for example. A cardholder interface may also include any of a mouse, touch screen, keyboard, keypad, voice reader, voice recognizer, dialogue screen, menu box, list, checkbox, toggle switch, a pushbutton or any other device that allows a cardholder to receive information regarding the operation of the processing machine as it processes a set of instructions and/or provides the processing machine with information. Accordingly, the cardholder interface is any device that provides communication between a cardholder and a processing machine. The information provided by the cardholder to the processing machine through the cardholder interface may be in the form of a command, a selection of data, or some other input, for example.

As discussed above, a cardholder interface is utilized by the processing machine that performs a set of instructions such that the processing machine processes data for a cardholder. The cardholder interface is typically used by the processing machine for interacting with a cardholder either to convey information or receive information from the cardholder. However, it should be appreciated that in accordance with some embodiments of the system and method of the invention, it is not necessary that a human cardholder actually interact with a cardholder interface used by the processing machine of the invention. Rather, it is also contemplated that the cardholder interface of the invention might interact, i.e., convey and receive information, with another processing machine, rather than a human cardholder. Accordingly, the other processing machine might be characterized as a cardholder. Further, it is contemplated that a cardholder interface utilized in the system and method of the invention may interact partially with another processing machine or processing machines, while also interacting partially with a human cardholder.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for universal data modeling comprising: in an information processing apparatus comprising at least one computer processor:

acquiring a data set of a plurality of different data types from a plurality of data sources, the data types including purchased data, earned data, and owned data, and unstructured data, and each of the data types comprising anonymous and nonanonymous customer data for customers of an organization;

ingesting the data set into a data repository in a plurality of different data formats, the plurality of different data formats comprising structured data, unstructured data, relational data, and non-relational data;

adapting the ingestion of the data set based on one or more object structure changes in one or more of the plurality of data sources, the adapting comprising detecting one or more data mappings affected by the one or more object structure changes and dynamically generating and executing rewritten code on a data lake that are consistent with the semantics of the object structure changes;

applying at least one of a plurality of quality control check to the data set for anomaly and error detection, the quality control checks comprising a data population check, a missing value check, and a comparison across the data set;

assigning a score based on the quality control check that indicates an overall quality of each data domain wherein the score is visualized through a user interface in support of further analysis of the data; enriching the data; and performing data analytics on the data to associate some of the data with one of the plurality of customers.

2. The method of claim 1, wherein the data sources comprise data sources that are internal to the organization and data sources that are external to the organization.

3. The method of claim 1, wherein the step of enriching the data comprises applying natural language processing to process the data.

4. The method of claim 1, wherein the step of performing data analytics on the data to associate the data with one of the plurality of customers comprises using machine learning to associate the data with the customer.

5. The method of claim 1, further comprising:
de-anonymizing the anonymous customer data.

6. The method of claim 1, wherein the step of enriching the data comprises:
analyzing at least one customer online behavior in the data to identify a product or service with which the customer is interested; and
associating the product or service with the customer.

7. The method of claim 6, wherein the customer online behavior comprises at least one of an interaction with a web page, a mouse movement, a cursor movement, and an activated link.

8. The method of claim 1, further comprising:
identifying a course of action for interacting with the customer based on the associated data.

* * * * *